United States Patent [19]

Smith et al.

[11] Patent Number: 5,638,301

[45] Date of Patent: Jun. 10, 1997

[54] METHOD AND SYSTEM FOR INSPECTING DIE SETS USING FREE-FORM INSPECTION TECHNIQUES

[75] Inventors: Gregory H. Smith, Ann Arbor; Samuel E. Ebenstein, Southfield; Vijitha S. Kiridena, Inkster, all of Mich.

[73] Assignee: Ford Motor Company, Dearborn, Mich.

[21] Appl. No.: 533,876

[22] Filed: Sep. 26, 1995

Related U.S. Application Data

[63] Continuation-in-part of Ser. No. 421,725, Apr. 13, 1995, Pat. No. 5,546,328, which is a continuation-in-part of Ser. No. 252,813, Jun. 2, 1994, Pat. No. 5,442,572.

[51] Int. Cl.$^6$ .................................................. G06K 9/32
[52] U.S. Cl. .................................. 364/552; 364/514 A
[58] Field of Search ......................... 364/469, 474.28, 364/474.34, 474.35, 474.36, 514 A, 525, 552, 554, 560–563, 581; 382/141, 144, 145, 147, 151

[56] References Cited

U.S. PATENT DOCUMENTS

| | | | |
|---|---|---|---|
| 3,911,257 | 10/1975 | Whitehouse et al. | 235/151.3 |
| 4,038,536 | 7/1977 | Feintuch | 235/152 |
| 4,117,538 | 9/1978 | Shrader et al. | 364/517 |
| 4,118,730 | 10/1978 | Lemelson | 358/93 |
| 4,239,388 | 12/1980 | Green | 356/5 |
| 4,240,745 | 12/1980 | Green | 356/5 |
| 4,437,151 | 3/1984 | Hurt et al. | 364/571 |
| 4,488,173 | 12/1984 | Di Matteo et al. | 358/107 |
| 4,591,985 | 5/1986 | Tsuji | 364/424 |
| 4,596,037 | 6/1986 | Bouchard et al. | 382/8 |
| 4,630,225 | 12/1986 | Hisano | 364/559 |
| 4,654,808 | 3/1987 | Potter et al. | 364/553 |
| 4,654,809 | 3/1987 | Adcock | 364/553 |
| 4,658,367 | 4/1987 | Potter | 364/553 |
| 4,724,330 | 2/1988 | Tuhro | 250/578 |
| 4,724,525 | 2/1988 | Purcell et al. | 364/560 |
| 4,759,074 | 7/1988 | Iadipaolo et al. | 382/23 |
| 4,796,997 | 1/1989 | Svetkoff et al. | 356/376 |
| 4,805,224 | 2/1989 | Koezuka et al. | 382/8 |
| 4,864,227 | 9/1989 | Sato | 324/158 F |
| 4,878,169 | 10/1989 | Toner et al. | 364/413.19 |
| 4,972,311 | 11/1990 | Holdgrafer et al. | 364/167.01 |
| 4,990,302 | 2/1991 | Oda et al. | 376/216 |
| 5,027,281 | 6/1991 | Rekow et al. | 364/474.24 |
| 5,048,094 | 9/1991 | Aoyama et al. | 382/8 |
| 5,056,052 | 10/1991 | Wick et al. | 364/572 |
| 5,065,334 | 11/1991 | Taylor et al. | 364/485 |
| 5,121,333 | 6/1992 | Riley et al. | 364/474.05 |
| 5,121,334 | 6/1992 | Riley et al. | 364/474.05 |
| 5,128,870 | 7/1992 | Erdman et al. | 364/474.05 |
| 5,136,242 | 8/1992 | Abraham-Fuchs | 324/244 |
| 5,184,306 | 2/1993 | Erdman et al. | 364/474.05 |
| 5,257,203 | 10/1993 | Riley et al. | 364/474.05 |
| 5,270,560 | 12/1993 | Cheng | 250/561 |
| 5,295,200 | 3/1994 | Boyer | 382/43 |
| 5,307,421 | 4/1994 | Darboux et al. | 382/8 |
| 5,319,567 | 6/1994 | Ebenstein | 364/474.34 |
| 5,353,356 | 10/1994 | Waugh et al. | 382/8 |
| 5,384,717 | 1/1995 | Ebenstein | 364/560 |
| 5,442,572 | 8/1995 | Kiridena et al. | 364/560 |

FOREIGN PATENT DOCUMENTS 58-56758   4/1983   Japan .

*Primary Examiner*—Emanuel T. Voeltz
*Assistant Examiner*—Craig Steven Miller
*Attorney, Agent, or Firm*—Richard D. Dixon; Roger L. May

[57] ABSTRACT

The method and system provide a means of inspecting die sets by scanning the core die and the cavity die separately. A special software technique is used to transform both data scans to the same coordinate system or frame in an orientation which simulates die closure. Then methods are used to determined the exact shape of the interior of the die set when closed.

20 Claims, 9 Drawing Sheets

METHOD AND SYSTEM FOR INSPECTING DIE SETS USING FREE-FORM INSPECTION TECHNIQUES

CROSS-REFERENCE TO RELATED APPLICATIONS

This application is a continuation-in-part application of U.S. patent application Ser. No. 08/421,725, filed Apr. 13, 1995 now U.S. Pat. No. 5,546,328, which, in turn, is a continuation-in-part application of U.S. patent application Ser. No. 08/252,813, filed Jun. 2, 1994, and issued Aug. 15, 1995 as U.S. Pat. No. 5,442,572.

TECHNICAL FIELD

This invention relates to methods and systems for inspecting die sets and, in particular, to non-contact methods and systems for inspecting die sets using free-form inspection techniques.

BACKGROUND ART

Die sets including core/cavity dies are widely used in the manufacture of injection molded plastic parts such as headlamps, tail lamps, park/turn lamps, instrument panels and many other automotive parts.

In order to achieve high volumes of production required by the automotive industry, it is necessary to utilize multiple sets of dies. Parts from any die set should be interchangeable with parts from any other set. However, this is often not the case. For example, the Ranger park and turn lamps are composed of two parts, lens and reflector. Three sets of dies (A, B and C) are used to produce lenses. Another three sets (D,E,F) are used to produce the mating reflectors. Reflectors from die set A fit well only with lenses from die set E and reflectors from die set C do not fit well with any lenses. This lack of interchangeability necessitates costly segregation of parts by dies to ensure good fit and requires scheduling overtime because one die set does not produce usable parts.

Differences in the geometry of these parts are primarily due to differences in the geometry of the dies. Since plastic parts shrink and warp as they solidify, small differences in the die are often exaggerated in the parts as they cool.

Coordinate measuring machines are used to check die sets. It is common practice to place balls or strips of ductal material such as clay or lead inside the die set and close it. Then the thickness of the material is measured.

SUMMARY OF THE INVENTION

An object of the present invention is to provide a method and system for inspecting die sets including core and cavity dies to such a high precision to enable rework of the die set thereby reducing die-to-die variability.

Another object of the present invention is to provide a method and system for inspecting die sets including core and cavity dies by scanning both parts of each die set separately wherein both data scans are transformed to the same coordinate system in an orientation which simulates die closure and wherein methods are used to determine the exact shape of the interior of the die set when closed.

In carrying out the above object and other objects of the present invention, a method is provided for inspecting die sets including core and cavity dies. The method includes the steps of providing a computer work station including a computer and an output device attached to the computer, scanning the core and cavity dies to generate scanned die signals and converting the scanned die signals to corresponding electrical die signals. The method also includes the step of generating core and cavity test die HDPDMs based on the electrical die signals. The die HDPDMs have a plurality of points describing the geometry of the core and cavity dies. The method further includes the steps of aligning the core die HDPDM and the cavity die HDPDM within a coordinate frame to simulate die set closure and computing a normal distance from the aligned core die HDPDM and the cavity die HDPDM to obtain distance data. Finally, the method includes the step of outputting an image on the output device based on the distance data. The image includes a plurality of pixels having a visually perceptible property representing thickness of a void between the core and cavity dies when the die set is in a closed position.

Preferably, the method also includes the step of outputting a master image on the output device. The master image includes a plurality of pixels having a visually perceptible property representing thickness of a void between core and cavity dies of a master die set when the master die set is in a closed position. Then, the images are compared to determine differences between the die set and the master die set.

Also, preferably, the method includes the steps of providing aligned core and cavity master die HDPDMs having a plurality of points which describe the geometry of the core and cavity master dies. The aligned core and cavity master die HDPDMs simulate master die set closure.

Still, preferably, the visually perceptible property is color.

Further in carrying out the above object and other objects of the present invention, a system is provided for carrying out each of the above method steps.

In general, the method and system of the present invention provide a means of capturing the geometry of a die set in an open position through laser scanning, using computer techniques to transform them into their actual closed position, and displaying the thickness of the void between the core and cavity into which molten plastic is injected to form the part. This thickness is displayed as a three dimensional color encoded image which enables analysis of the thickness of the parts that would be produced by this die set.

Further, this method provides a means of comparing two die sets to determine differences between them. The process relies on feature based methods to achieve initial alignment of the dies and then employs optimization techniques to determine their true closed alignment. This method compares the geometry of a die set to a master or reference set. The geometry of the die set usually comes from laser scanning of a physical die set. The geometry of the master die set may come from laser scanning of a die set that produces acceptable parts, or from a CAD/math model of the design intent for the die set.

For example, if die set A produces acceptable parts, while die set B does not, then the method can be used to show where die set B differs from die set A. Then this information can be used so that set B can be reworked so that it will have the same geometry as set A, and the parts produced by both die sets will be interchangeable. Toward this end the method seeks to minimize the amount of rework necessary to accomplish part interchangeability.

The proposed method uses a High Density Point Data Model (HDPDM) to represent both the core and cavity portions of the die surfaces. For more information about HDPDMs, see U.S. Patent No. 5,442,572 entitled "Method and System for Comparing Free-Form Geometries Using High Density Point Data Models" which is hereby incorporated in its entirety by reference.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
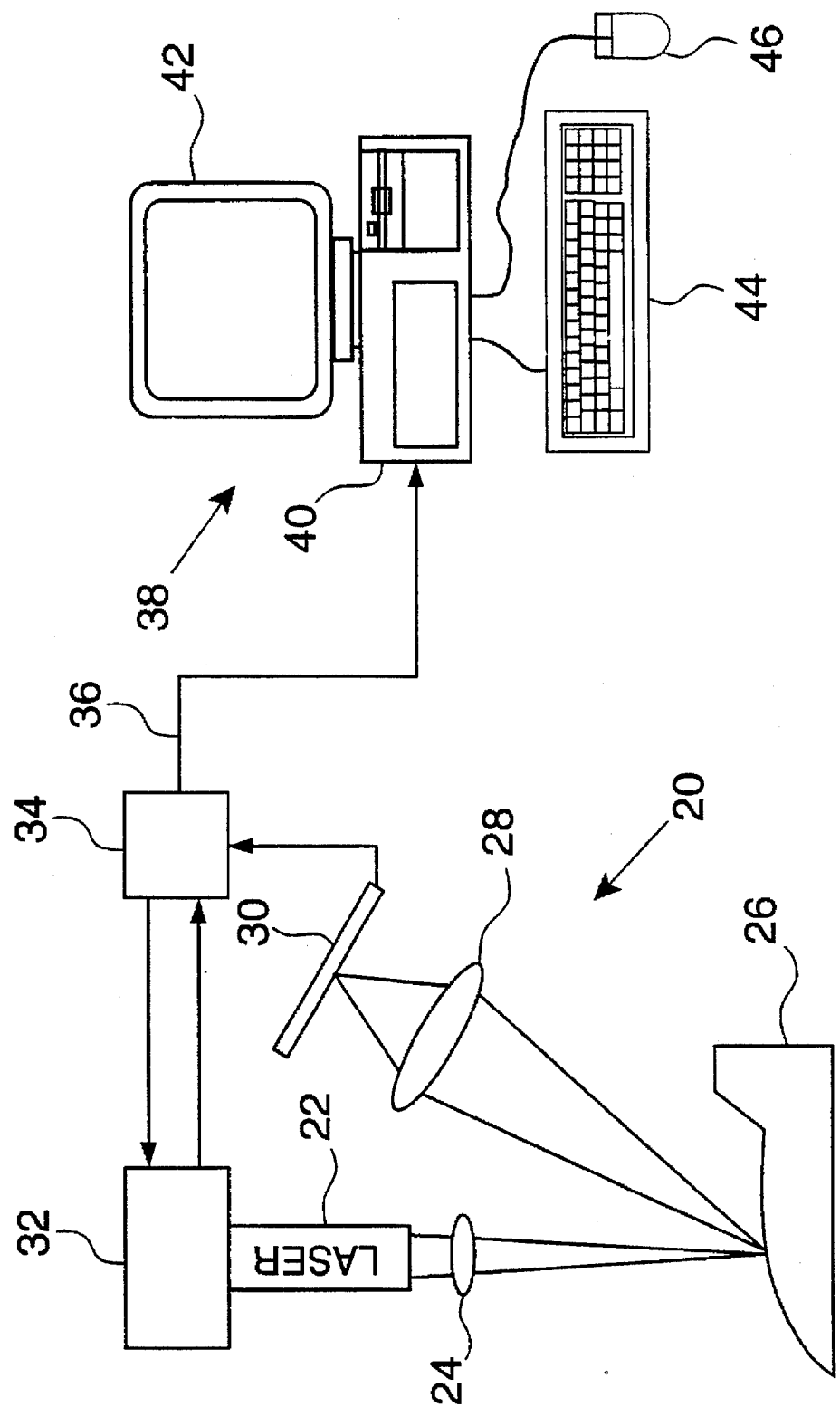
FIG. 1 is a schematic view of a laser scanner operation in accordance with the present invention.

Referring now to the drawing Figures, there is illustrated a method and system of the present invention. In FIG. 1, a laser scanner, generally indicated at 20, operates on the triangulation principle. A beam of laser light is generated by a laser 22 and is focused by a lens 24 on a part 26 being scanned to produce an illuminated spot of approximately 0.2 millimeters in diameter. An image of the spot is viewed by an "eye" or lens 28 that focuses on a spot image on a sensor 30 mounted on an angle to the axis of a laser beam. The sensor 30 contains a linear array of photodetectors or diodes. The position at which the image of the spot falls on the array is a function of the distance of the point being scanned to the scanner 20. The number of photodetectors illuminated will vary as an angle of the surface of the part 26 varies. In general, several photodetectors will be illuminated. The light intensity for each photodetector illuminated is used to compute the centroid of the spot image and thus achieve an accurate measurement independent of the surface angle. Since the size of the sensor 30 is limited, there is a limited range in which the scanner 20 can operate and maintain the spot image on the sensor 30.

This determines the depth of field for the scanner 20. A typical depth of field is 6 millimeters.

In operation, the laser scanner 20 is mounted so that it can be moved over the surface of a part such as a core or cavity die of a test or master die set. For example, the laser scanner may be mounted in the spindle of a vertical machine center 32 and is moved over the surface of the die 26 being scanned by the center's X and Y axes in a series of linear scans.

The laser scanner 20 communicates with the controller 34 of the machine center 32 and adjusts the Z axis to maintain the scanner 20 within a 6 millimeter depth of field. The Z dimension returned along the line 36 from the scanning system is then the algebraic sum of the Z axis servo move and the position given by the laser scanner 20. The Z dimension is input to a computer work station, generally indicated at 38. The work station 38 includes a chassis 40, a display screen 42, a keyboard 44 and a mouse 46 all connected in a typical fashion. The work station is programmed to have a graphical user interface. Additional description of the above-noted system can be found in U.S. Pat. No. 5,319,567.

The method of the present invention includes the step of obtaining HDPDMs for the die set from the electrical signals by using the methods described in U.S. Pat. No. 5,442,572.

Then initial alignment of the HDPDMs of the core and cavity dies of the die set are determined using feature based techniques described in detail herein.

Then, the true closed alignment of the die set is determined using optimization techniques which minimize the distances between mating surfaces of the die set. This is also described in detail herein. The core HDPDM and cavity HDPDM must be registered very precisely in the same coordinate frame for proper comparison, otherwise alignment errors will prevent proper calculation of the distance between the core and cavity portions of the die set.

The normal distance between the core and cavity HDPDMs of the die set is then computed using the methods of U.S. Pat. No. 5,442,572.

Figure 4:
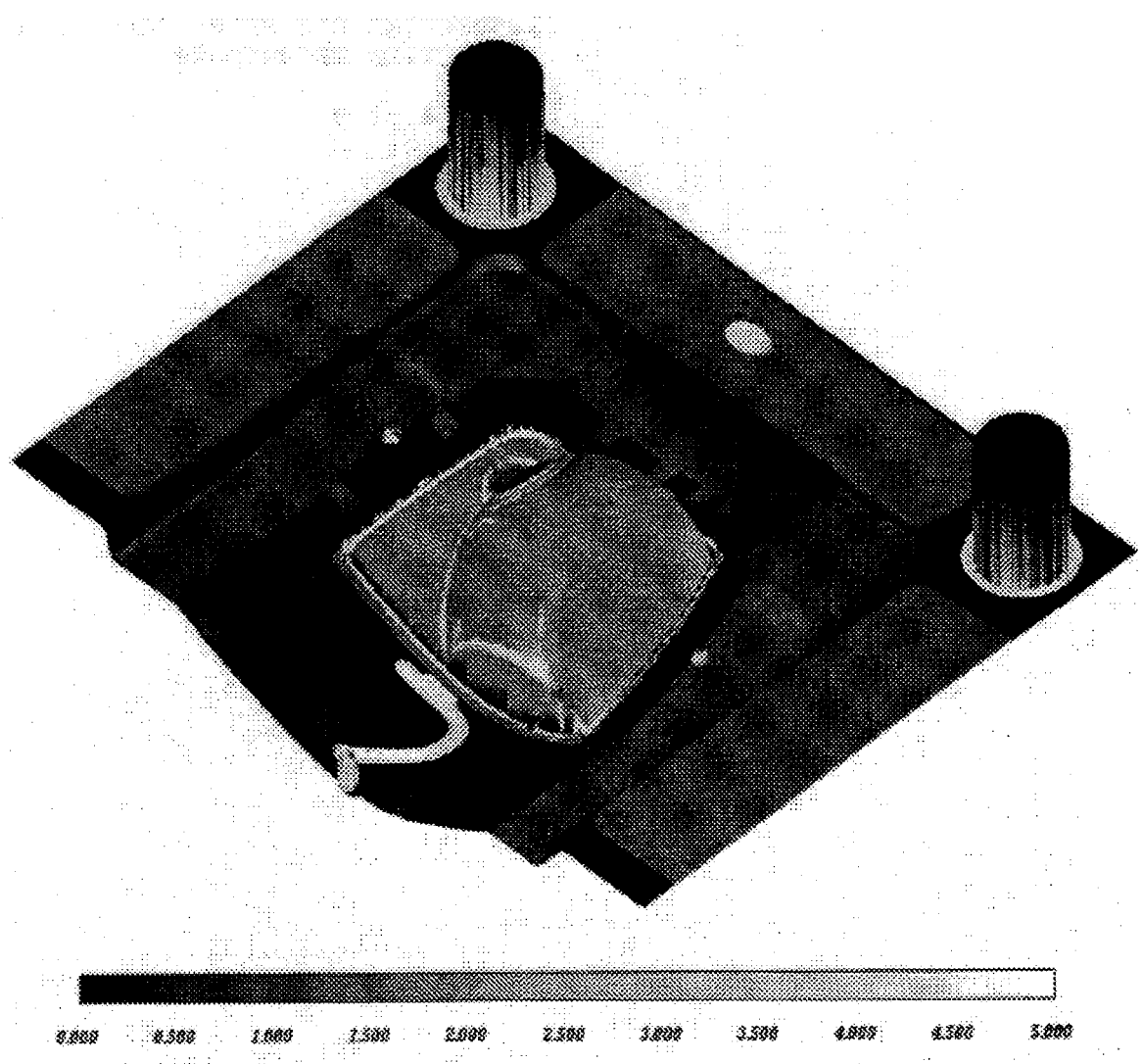
FIG. 4 is a view illustrating core-to-cavity distance.

The thickness of the void between the core and cavity portions of the die set into which molten plastic is injected to form the part is displayed on the screen 42 as a color encoded three dimensional image as shown in FIG. 4.

Then, HDPDMs for the master die set are obtained. This can be done in the same manner as for the test HDPDMs. If the master die set is a physical part, the above-noted alignment steps are performed to obtain alignment. If the master is a CAD/Math model or representation, the alignment is inherent in the model.

The thickness of the void between the core and cavity of the master die set into which molten plastic is injected to form the part is displayed on the screen 42 as a color encoded three dimensional image as shown in FIG. 4. Differences between the die sets are evident from the differences between the images displayed on the screen 42.

The die cavity may then be recut using the geometry obtained from the master die cavity and the reference obtained from the alignment of the cores. In order to determine the minimum rework necessary to produce interchangeable parts, the best alignment of the cores is determined using the procedures described in the above-noted U.S. Pat. No. 5,546,328. Then, this alignment is used to compare the cavities. The differences shown by this comparison determines how the cavity should be modified to improve the interchangeability of the parts. While the procedure of modifying only the cavity portion of the die set does not, in general, guarantee interchangeability, sufficient improvement can usually be achieved to accomplish the task with this minimal rework procedure.

Computer Simulation of Die Closure

Initial Feature Based Alignment

Unless X-ray techniques are used, the die set must be inspected by inspecting its component parts with the die set open, for example the core and cavity halves. The HDPDM of the components must then be brought into alignment that corresponds to the closed condition of the die set. Such dies are constructed with guide bushings and alignment pins to facilitate mating of the dies. However, the actual final alignment of the die components is determined by mating surfaces within the die. These surfaces are usually created using a spotting press to establish final die closure conditions.

The method of the present invention closely simulates this physical closing of the die set. The initial alignment is established using the guide pins and bushings. Then, the final alignment is done using the mating surfaces of the die set.

The HDPDMs of the die set components can be transformed to simulate initial closing using any computer visualization software that can read HDPDMs, add points at specified locations and manipulate the spacial orientation of the data. (Surfacer from Imageware of Ann Arbor, Mich. is an example of one software package with this capability).

Figure 9:
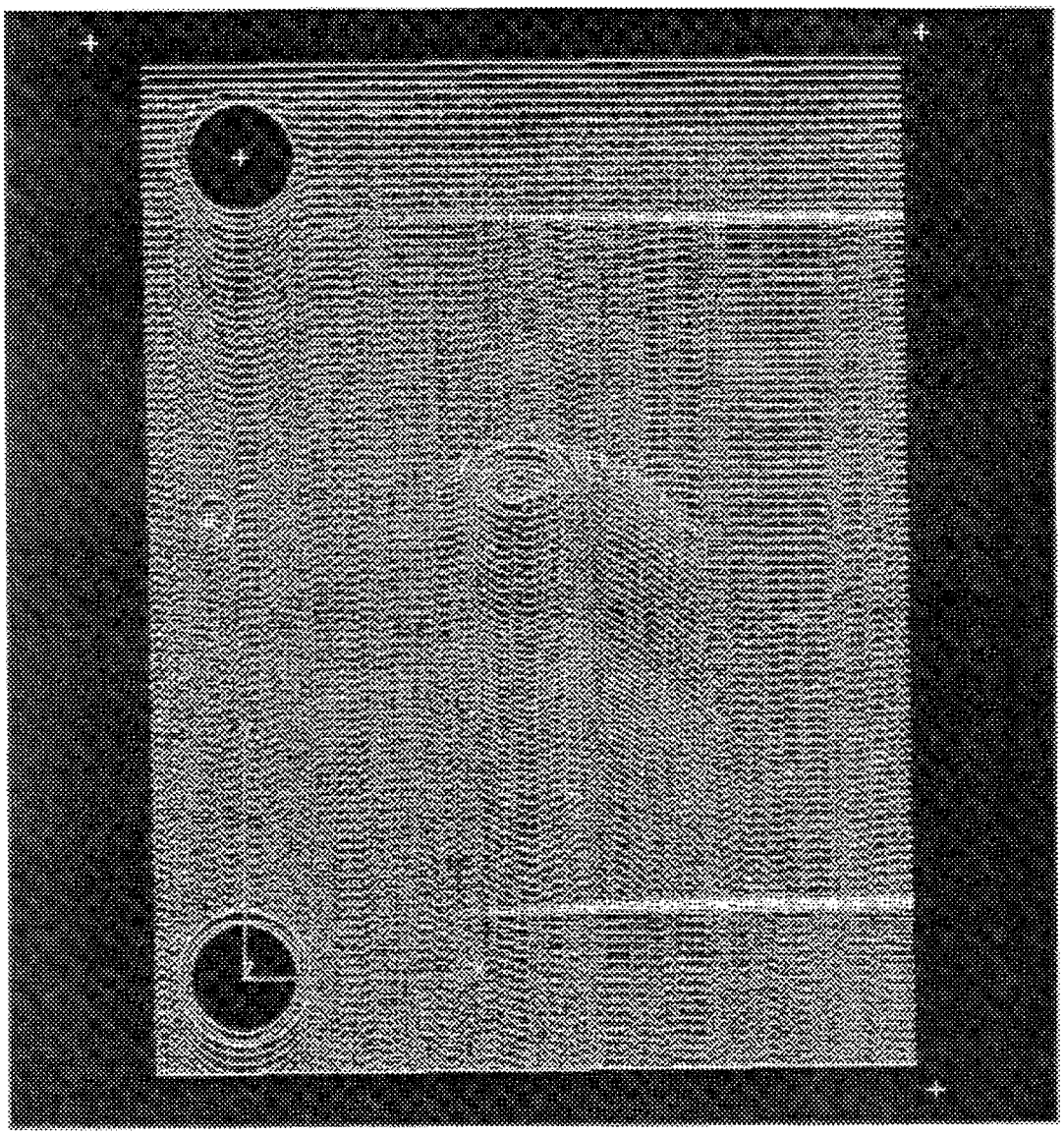
FIG. 9 is a view illustrating a core HDPDM with three added points.

First, add 3 non-collinear points to the HDPDM. Then, let $$P_1, P_2, P_3 \quad (1)$$

represent the x,y,z coordinates 3 non-collinear points added to the computer representation of the core data set in some coordinate system. These points should be outside the bounding box of the original HDPDM so they are clearly visible. See FIG. 9.

Next, the HDPDM of the core (with the 3 added points) is manipulated so that a plane defined by the 4 corners of the die (the dark areas in FIG. 4) lie in an X Y plane at Z=0. This will orient the representation of the core so that its closing plane is in the X Y plane and the mating surfaces at the corners of the part are at Z=0.

Next, the center of one guide bushing (or other suitable reference feature) is found using the method described in U.S. Pat. Nos. 5,319,567 and 5,384,717, both of which are hereby incorporated in their entirety by reference. This point is projected along the Z axis to the Z=0 position. The HDPDM (with the 3 added points) is translated so that this point is at the origin of the coordinate system. Then the center of the other bushing (or other suitable reference feature) is found and the HDPDM (with the 3 added points) is rotated to align a line from the center of the first bushing to the center of the second bushing with the Y axis of the coordinate system.

This procedure performs a rigid body transformation on the HDPDM (with the 3 added points) such that the model is in an orientation defined by its reference features. By interrogating the software it is possible to determine the new coordinates of the added reference points $$v_1, v_2, v_3 \quad (2)$$

after the transformation.

This uniquely determines a rigid body transformation matrix $T_{core}$ where $$T_{core}(P_i)=v_i \quad (3)$$

for i=1,2,3

The matrix $T_{core}$ can be used to transform the original data from the core HDPDM to an orientation in the global coordinate system defined by its locating features.

By using a similar process, the HDPDM for the cavity die can be aligned, and then rotated 180 degrees about the Y axis to bring it into its mating orientation and transformed to an orientation defined by locating features common with the core die to an orientation and position close to its closed position.

The three points added to the HDPDMs serve to capture the translations and rotations necessary to align the data sets. They do not aid in alignment, but serve as a convenient device to capture the manipulations required to align the data. The points can be added to the data in any convenient location.

Final Precise Alignment

The methods of U.S. Pat. No. 5,546,328, entitled "Method and System for Automated Alignment of Free-Form Geometries" are applied as follows. Consider only the areas of the die set which correspond to the mating surfaces (i.e., those areas that actually touch when the die closes) of the core and cavity dies. An objective function is used which is optimized when the distance between the core and cavity dies in the region of their mating surfaces are zero or slightly positive. Negative distances are penalized in the optimization since penetration of one mating surface into the other is not physically possible.

When the physical die closes, the core die contacts the cavity die so that the die mating surfaces are in direct physical contact. A physical inspection of the dies reveals witness marks on the mating surfaces where this physical contact occurs. The very dark areas in FIG. 4 correspond to where the mating surfaces on the core half of this die set.

Figure 2:
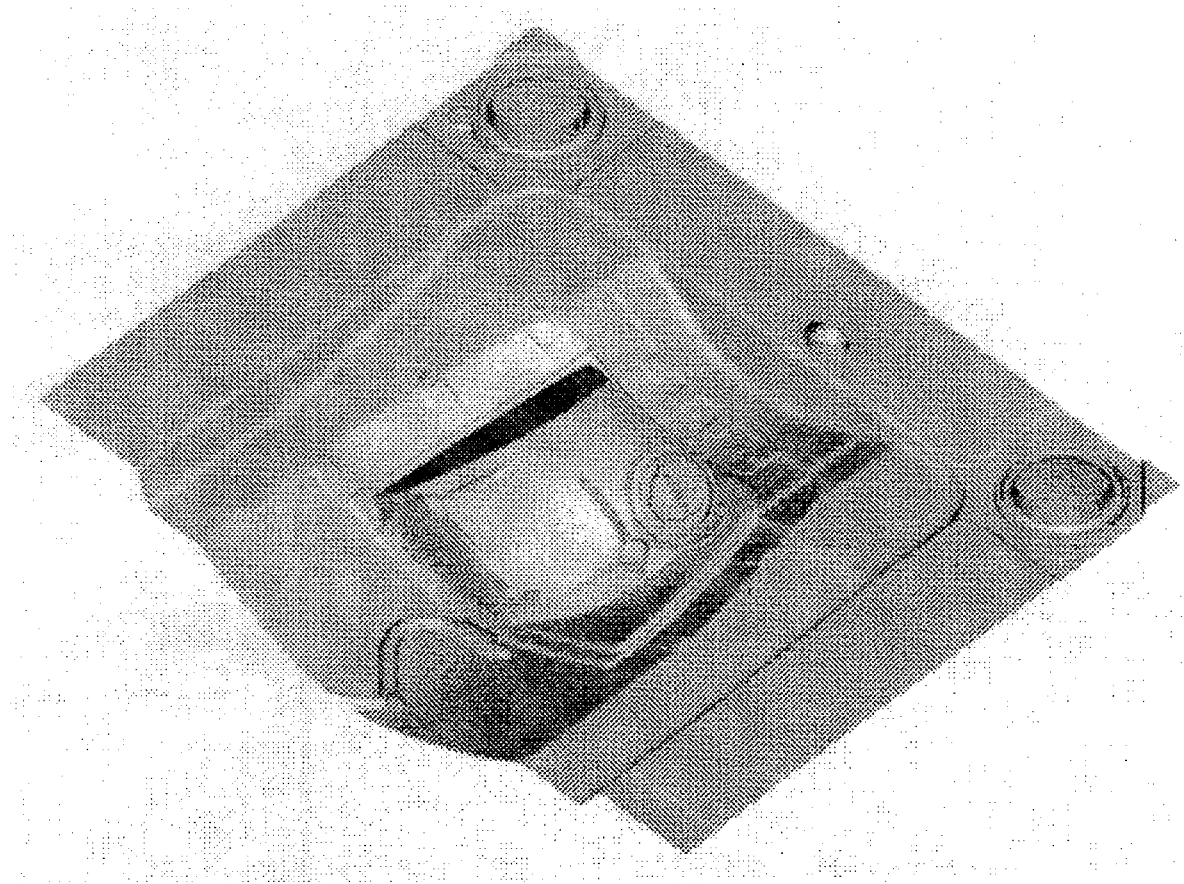
FIG. 2 is a view illustrating a laser scan of a cavity portion or die of a die set.
Figure 3:
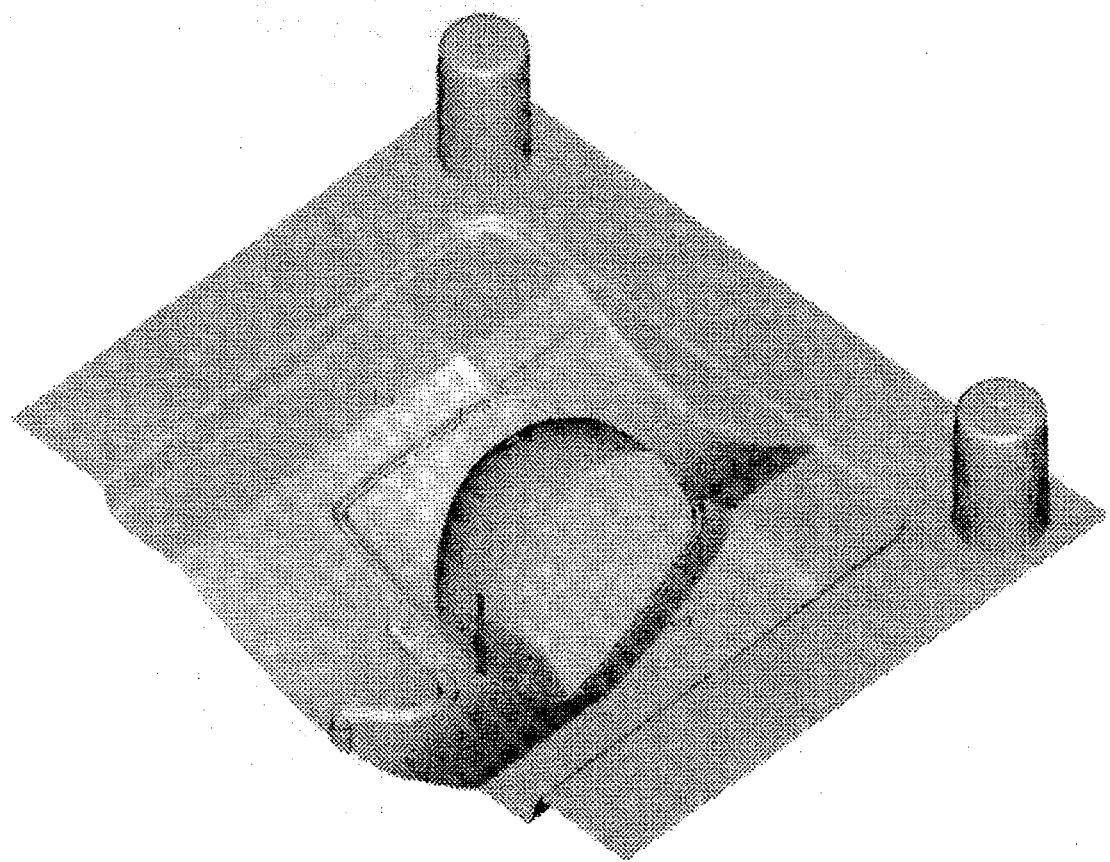
FIG. 3 is a view illustrating a laser scan of a core portion or die of the die set.

Two core/cavity die sets may be used to produce plastic park/turn reflectors for a particular truck line. The die sets are called set A and set C. Although they should be, the parts from the two die sets are not interchangeable, and the manufacturing plant needs to use part bins to sort and store the parts separately. FIG. 2 shows the core portion of die set A while FIG. 3 show the cavity portion of the same die.

Figure 5:
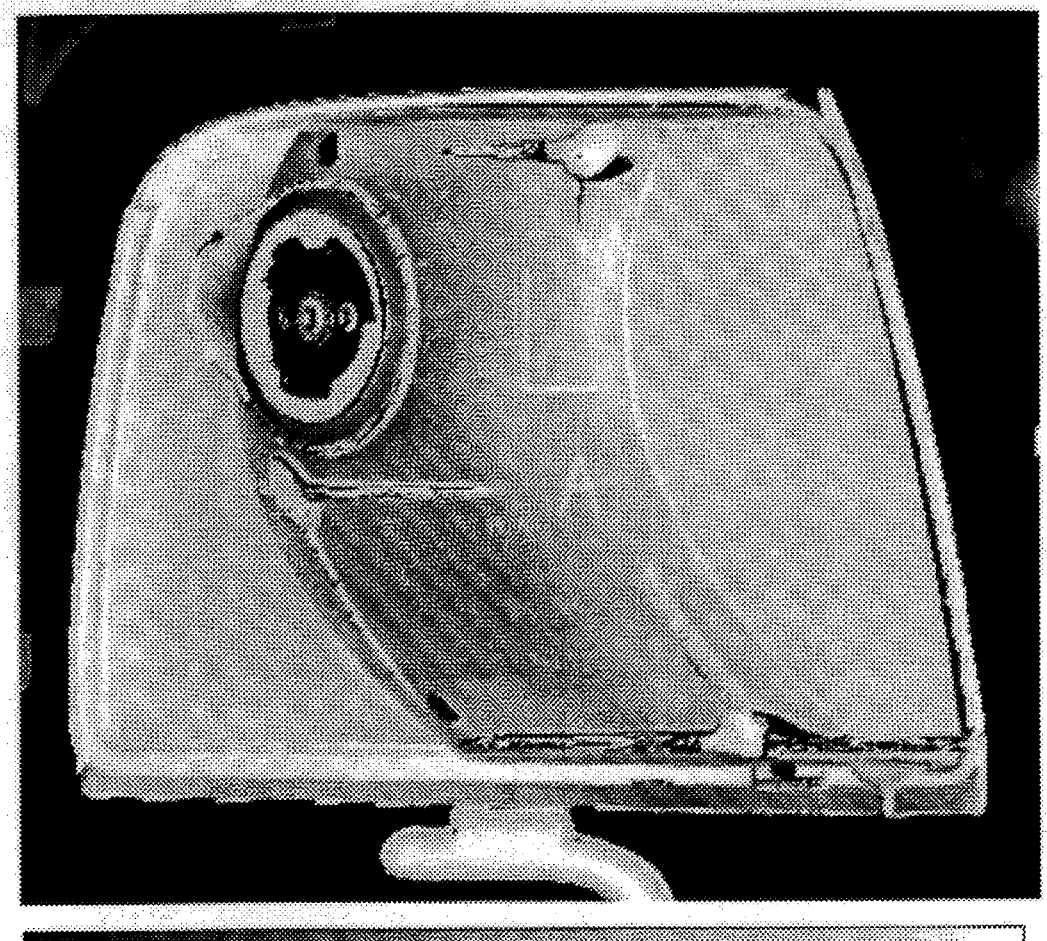
FIG. 5 is a view illustrating core-to-cavity distance for die set A.

The shading of FIG. 4 shows distances between the two parts of the die when die closure has been simulated. Lighter shading indicates greater distance while darker shading indicates less distance. Black indicates areas where the two halves touch. FIG. 5 is basically the same as FIG. 4 but the viewing area has been restricted to the part of the die which controls the part geometry.

Figure 6:
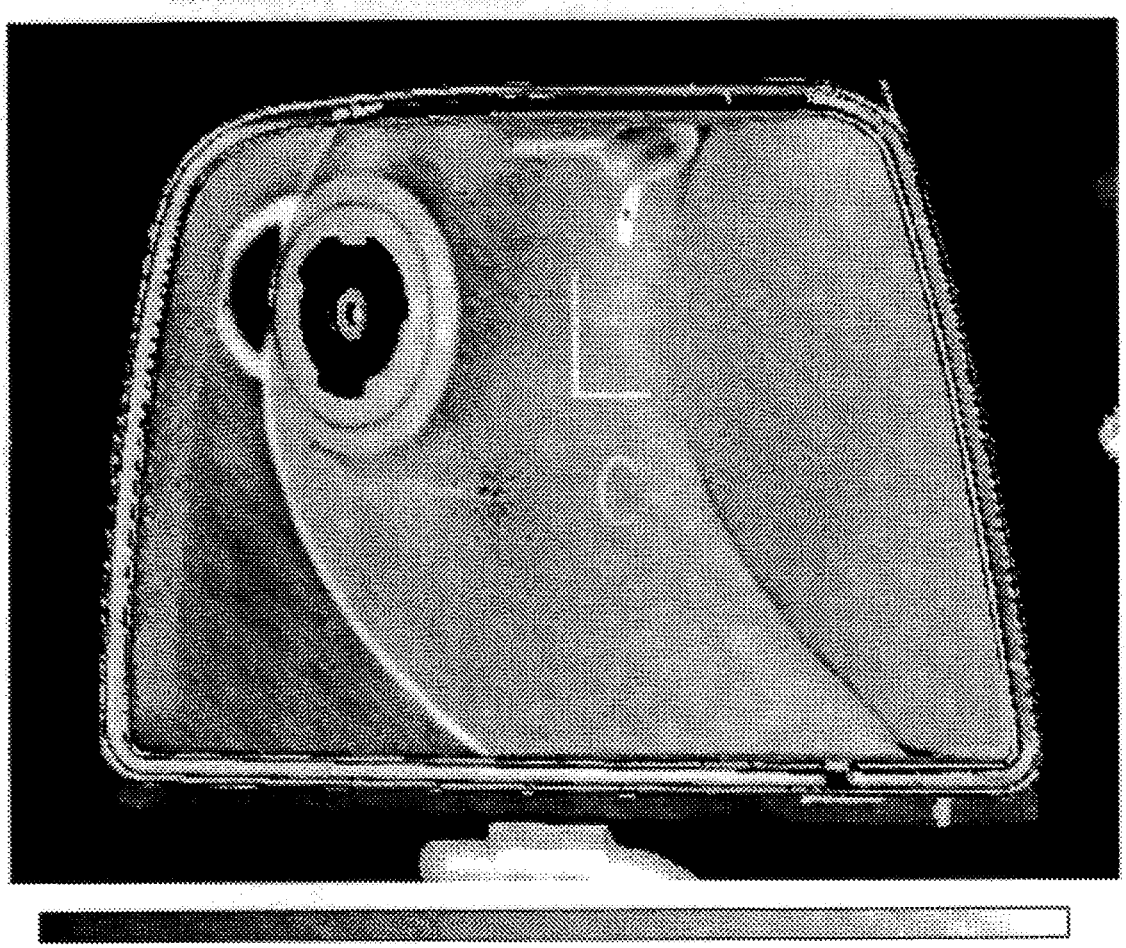
FIG. 6 is a view illustrating core-to-cavity distance for die set C.

FIG. 6 shows the same thing for die set C.

An inspection of FIGS. 5 and 6 shows that there is a significant difference in the geometries of the two die sets in the area of the reflector wall on the right, as indicated by the difference in shading of this area. Parts from die set A are approximately 2.5 mm while parts from die set C are approximately 2.0 mm in thickness. This difference in thickness causes the parts to shrink in different ways when they cool and creates non-interchangeable parts. It is necessary to rework die set C so that it produces parts that are interchangeable with die set A.

Figure 7:
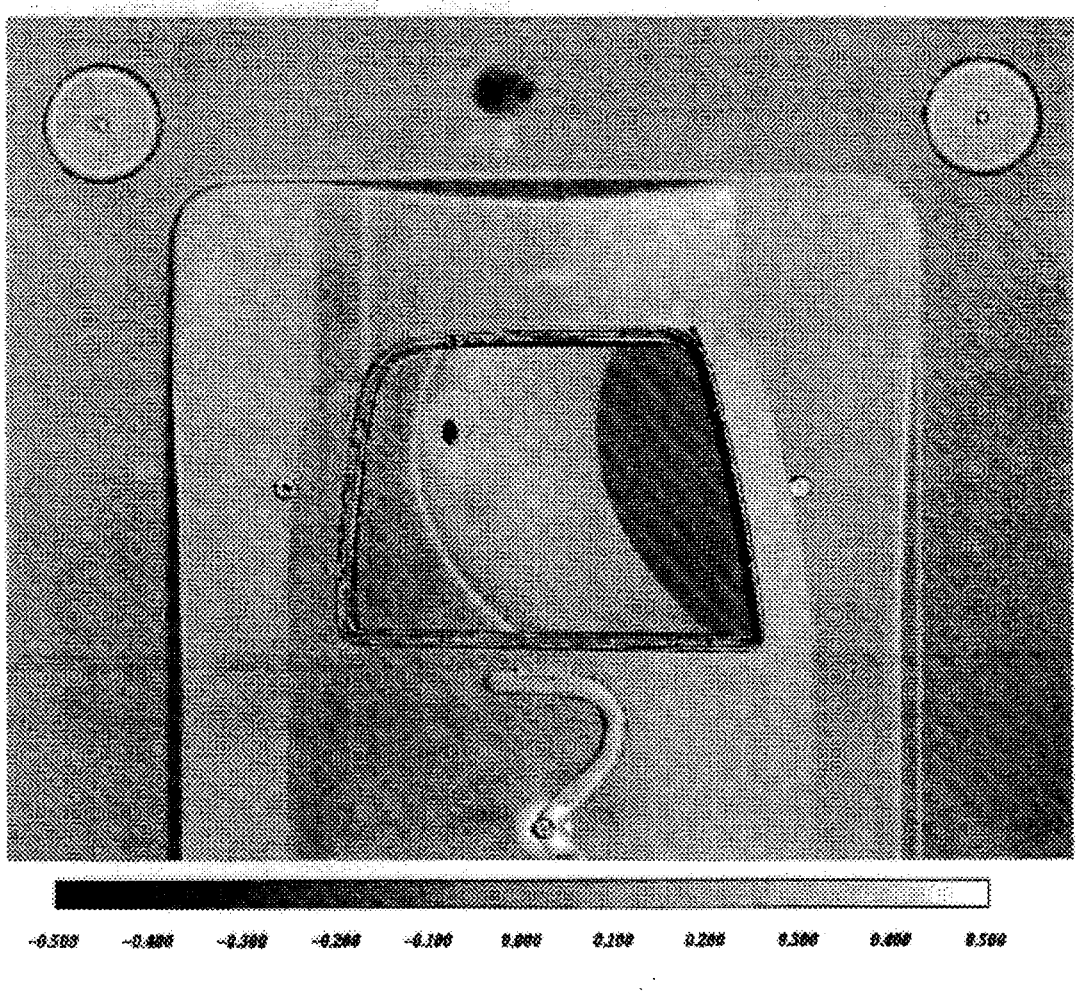
FIG. 7 is a view illustrating an A core to C core inspection map.
Figure 8:
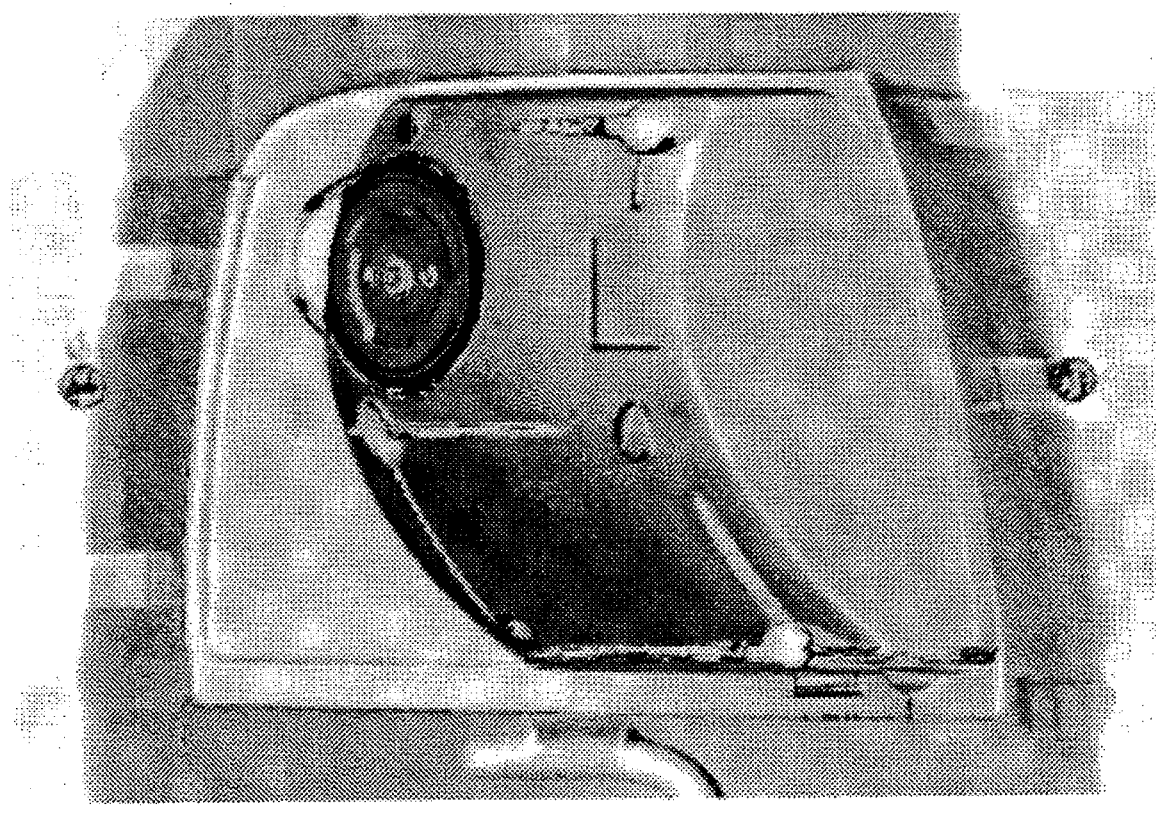
FIG. 8 is a view illustrating an A cavity to C cavity inspection map.

In order to minimize this rework, it is preferable to modify only the cavity portions if possible, since they are less complex than the core portions. By using the methods of U.S. Ser. No. 08/421,725, one can find the transformation which gives the best fit between core A and core C. FIG. 7 shows a comparison of core A to core C produced by this method. This inspection map shows good agreement between the core geometries. If one then applies the transformation obtained by optimizing the fit of the core geometries to the cavity HDPDMs, one obtains an inspection map which displays the differences between the cavities shown in FIG. 8. It is clear from FIGS. 7 and 8 that by reworking only the cavity die half, most of the difference between parts produced by the A and C die sets can be removed. This can be accomplished by recutting cavity die C using the data from cavity die A.

While the best mode for carrying out the invention has been described in detail, those familiar with the art to which this invention relates will recognize various alternative designs and embodiments for practicing the invention as defined by the following claims.

What is claimed is:

1. A method of inspecting die sets including core and cavity dies, the method comprising the steps of:
   providing a computer work station including a computer and an output device attached to the computer;
   scanning the core and cavity dies to generate scanned die signals;

converting the scanned die signals to corresponding electrical die signals;

generating core and cavity die HDPDMs, based on the electrical die signals, the die HDPDMs having a plurality of points describing the geometry of the core and cavity dies;

aligning the core die HDPDM and the cavity die HDPDM within a coordinate frame to simulate die set closure;

computing a normal distance from the aligned core die HDPDM and the cavity die HDPDM to obtain distance data; and outputting an image on the output device based on the distance data, the image including a plurality of pixels having a visually perceptible property representing thickness of a void between the core and cavity dies when the die set is in a closed position.

2. The method as claimed in claim 1 further comprising the steps of outputting a master image on the output device, the master image including a plurality of pixels having a visually perceptible property representing thickness of a void between core and cavity master dies of a master die set when the master die set is in a closed position; and comparing the images to determine differences between the die sets.

3. The method as claimed in claim 2 further comprising the steps of providing aligned core and cavity master die HDPDMs having a plurality of points which describe the geometry of core and cavity master dies, the aligned core and cavity master die HDPDMs simulating master die set closure, and computing a normal distance from the aligned core and cavity master die HDPDMs to obtain a second set of distance data and wherein the master image is based on the second set of distance data.

4. The method as claimed in claim 3 further comprising the step of aligning the core die HDPDMs to obtain an alignment and comparing the cavity die HDPDMs based on the alignment to determine differences between.

5. The method as claimed in claim 2 wherein the master image is based on distance data obtained from a CAD model of the master die set.

6. The method as claimed in claim 2 wherein the master image is based on distance data obtained from a math model of the master die set.

7. The method as claimed in claim 2 wherein the master image is based on distance data obtained from aligned HDPDMs representing a closed position of the master die set.

8. The method as claimed in claim 1 wherein the step of aligning includes the steps of determining an initial alignment between the HDPDMs to simulate initial closure of the die set; and determining a final alignment between the HDPDMs based on the initial alignment.

9. The method as claimed in claim 1 wherein the step of scanning is a laser scanning step.

10. The method as claimed in claim 1 wherein the visually perceptible property is color.

11. A system of inspecting die sets including core and cavity dies, the system comprising:

a computer work station including a computer and an output device attached to the computer;

means for scanning the core and cavity dies to generate scanned die signals;

means for converting the scanned die signals to corresponding electrical die signals;

means for generating core and cavity die HDPDMs based on the electrical die signals, the die HDPDMs having a plurality of points describing the geometry of the core and cavity dies;

means for aligning the core die HDPDM and the cavity die HDPDM within a coordinate frame to simulate die set closure;

means for computing a normal distance from the aligned core die HDPDM and the cavity die HDPDM to obtain distance data; and means for outputting an image on the output device based on the distance data, the image including a plurality of pixels having a visually perceptible property representing thickness of a void between the core and cavity dies when the die set is in a closed position.

12. The system as claimed in claim 11 further comprising means for outputting a master image on the output device, the master image including a plurality of pixels having a visually perceptible property representing thickness of a void between core and cavity master dies of a master die set when the master die set is in a closed position; and means for comparing the images to determine differences between the die sets.

13. The system as claimed in claim 12 further comprising means for providing aligned core and cavity master die HDPDMs having a plurality of points which describe the geometry of core and cavity master dies, the aligned core and cavity master die HDPDMs simulating master die set closure, and means for computing a normal distance from the aligned core and cavity master die HDPDMs to obtain a second set of distance data and wherein the master image is based on the second set of distance data.

14. The system as claimed in claim 13 further comprising means for aligning the core die HDPDMs to obtain an alignment and means for comparing the cavity die HDPDMs based on the alignment to determine differences therebetween.

15. The system as claimed in claim 12 wherein the master image is based on distance data obtained from a CAD model of the master die set.

16. The system as claimed in claim 12 wherein the master image is based on distance data obtained from a math model of the master die set.

17. The system as claimed in claim 12 wherein the master image is based on distance data obtained from aligned HDPDMs representing a closed position of the master die set.

18. The system as claimed in claim 11 wherein the means for aligning includes means for an initial alignment between the HDPDMs to simulate initial closure of the die set; and means for determining a final alignment between the HDPDMs based on the initial alignment.

19. The system as claimed in claim 11 wherein the means for scanning includes a laser scanner.

20. The system as claimed in claim 11 wherein the visually perceptible property is color.

* * * * *